(12) United States Patent
Amit et al.

(10) Patent No.: US 8,788,468 B2
(45) Date of Patent: *Jul. 22, 2014

(54) DATA DEPULICATION USING SHORT TERM HISTORY

(75) Inventors: Jonathan Amit, Omer (IL); Chaim Koifman, Rishon Lezion (IL)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/480,194

(22) Filed: May 24, 2012

(65) Prior Publication Data

US 2013/0318050 A1 Nov. 28, 2013

(51) Int. Cl.
*G06F 7/00* (2006.01)
*G06F 17/00* (2006.01)

(52) U.S. Cl.
USPC .......................................................... 707/693

(58) Field of Classification Search
USPC ......... 707/615, 625, 633, 638, 646, 647, 693, 707/999.101
See application file for complete search history.

(56) References Cited

U.S. PATENT DOCUMENTS

| 7,870,105 | B2 | 1/2011 | Arakawa et al. |
| 7,925,624 | B2 * | 4/2011 | Vosshall et al. ............... 707/610 |
| 2008/0244172 | A1 | 10/2008 | Kano |
| 2009/0287901 | A1 | 11/2009 | Abali et al. |
| 2011/0055471 | A1 * | 3/2011 | Thatcher et al. .............. 711/114 |
| 2011/0246741 | A1 * | 10/2011 | Raymond et al. ............. 711/170 |
| 2012/0016845 | A1 * | 1/2012 | Bates ............................ 707/692 |
| 2012/0166401 | A1 * | 6/2012 | Li et al. ......................... 707/692 |
| 2013/0268496 | A1 * | 10/2013 | Baldwin et al. ............... 707/692 |

FOREIGN PATENT DOCUMENTS

| KR | 100985169 B1 | 10/2010 |
| KR | WO2011062387 A2 | 5/2011 |

OTHER PUBLICATIONS

Wang, X. et al, "Improved Decaying Bloom Filter for Duplicate Detection in Data Streams Over Sliding Window", Department of Computer Science, University of Science and Technology of China, School of Computer Science, University of Adelaide, Australia, 2010, 6 pages.
Debnath, B. et al, "ChunkStash: Speeding Up Storage De-duplication Using Flash Memory", 2010, 38 pages.
Chowdhury, Abdur. "Duplicate data detection." retrieved from http://ir.iit.edu/~abdur/Research/Duplicate.html (2004).

\* cited by examiner

*Primary Examiner* — Aleksandr Kerzhner
(74) *Attorney, Agent, or Firm* — Griffiths & Seaton PLLC (57) ABSTRACT

Exemplary system, and computer program product embodiments for data deduplication using short term history in a computing environment are provided. In one embodiment, by way of example only, a hash value is calculated on data chunks for a read operation. The calculated hash value is stored in a storage media. The calculated hash value is looked up in the storage media to verify if a current write operation was previously written and/or read. Additional system and computer program product embodiments are disclosed and provide related advantages.

18 Claims, 5 Drawing Sheets

DATA DEPULICATION USING SHORT TERM HISTORY

BACKGROUND OF THE INVENTION

1. Field of the Invention

The present invention relates in general to computers, and more particularly to data deduplication using short term history in a computing storage environment.

2. Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

Data deduplication refers to the reduction and/or elimination of redundant data. In data deduplication, a data object, which may be a file, a data stream, or some other form of data, is broken down into one or more parts called chunks, using a chunking method. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems. Several approaches to deduplication have been proposed, many of which using hashing techniques. Currently, however, a large database in the storage is required for storing the hash values. The detection process of these hash values involves input/output (I/O) operations to access the database, which leads to a decrease in efficiency and a reduction in productivity.

Currently, the deduplication detection is performed as follows. On each write operation of data to the storage, a hash value is calculated on each chunk. The history of the hash is stored in a database. The current write hash is looked for in a database to verify if this data has been previously written at some previous time period. To overcome the disk input/output (IO) for the database lookup, the database is cached in RAM. However, this approach has the following limitation. A large database in the storage is required for storing the hash. The detection process involves some IO to access the database when the hash is not cached in RAM, and also, higher grain verification will fail. The old hash that is no longer in the database (for a variety of reasons) will not be detected. The database may also provide stale advice and detect a hash of data that has been previously overwritten. Also, the implementation is also complicated.

In contrast, and to overcome these limitations, the illustrated embodiments calculate a hash on each chunk on each write operation of data to the storage. The history of HASH is stored only in a RAM and not in a database. Thus, the illustrated embodiments provide only a short-term history of data written to the storage. However, to overcome the short-term history problem, hash values are calculated on all the data read from the storage. The current write hash is searched in the RAM history, to verify if this data was already written in the near past, or read in the near past. (It should be noted that throughout the description, other media, such as solid state drives (SSD), flash technology, hard disks (HDD), or any other type of storage media, may be used. For convenience and illustration, the RAM is used throughout the description as an example only).

Accordingly, and in view of the foregoing, various method, system, and computer program product embodiments for data deduplication using short-term history in a computing environment are provided. In one embodiment, by way of example only, hash values are calculated on data chunks for a read operation. The calculated hash value is stored in storage media (e.g., RAM, HDD, SDD, etc.). The calculated hash value is looked up in the storage media to verify if a current write operation was previously written and/or read.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, data deduplication refers to the reduction and/or elimination of redundant data. Data deduplication, sometimes referred to as "intelligent compression" or "single instance storage," is a method of reducing storage needs by eliminating redundant data. In other words, duplicate copies of data are reduced or eliminated, leaving a minimal amount of redundant copies, or a single copy of the data, respectively. Only one unique instance of the data is actually retained on storage media, such as disk or tape. Using deduplication processes provides a variety of benefits, such as reduction of required storage capacity and increased network bandwidth. Redundant data is replaced with a pointer to the unique data copy. For example, a typical email system might contain 100 instances of the same one-megabyte (MB) file attachment. If the email platform is backed up or archived, all 100 instances are saved, requiring 100 MB storage space. With data deduplication, only one instance of the attachment is actually stored; each subsequent instance is just referenced back to the one saved copy. In this example, a 100 MB storage demand could be reduced to only one MB.

A deduplication detection process may be used to determine if data (e.g., a data chunk) already exists in storage. Each chunk of data is processed using a hash calculation, and this is currently performed only on a write operation (hash values are not calculated on the read operation). This process generates a unique number for each piece of data, which is then stored in an index (e.g., a hash value history table). If a file is updated, only the changed data is saved. That is, if only a few bytes of a document or presentation are changed, only the changed blocks are saved; the changes don't constitute an entirely new file. If that hash value is already in the large database (index), the piece of data is considered a duplicate and does not need to be stored again. Otherwise the new hash number is added to the index and the new data is stored. As mentioned above, a large database in the storage is required for storing the hash. The detection process of these hash values involves input/output (I/O) operations to access the database, since the hash values are not cached in RAM, and thus, higher grain verification of the hash values fail. Also, older hash values may not be detected if they are no longer in the database. Additionally, the large database may give stale and outdated advice/verification.

In contrast, and to address the inefficiencies previously described, the mechanisms of the illustrated embodiments calculate a hash value on each data chunk for each write operation of data to a storage system. However, the mechanisms calculate a hash value on each data chunk for each read operation of data from the storage system. The history of each calculated hash value (e.g., for both the read and write) is not stored in a database, but rather, the calculated hash values are stored in short term memory (e.g., any type of storage medium such as random-access memory RAM). The calculated hash value is looked up in the short-term memory (e.g., RAM) to verify if a current write operation was previously written and/or read in the near past. (As mentioned previously, it should be noted that throughout the description, other media, such as solid state drives (SSD), flash technology, hard disks (HDD), or any other type of storage media, may be used. For convenience and illustration, the RAM is used throughout the description as an example only). As such, calculating a hash value on each data chuck for each read operation provides increased efficiency and productivity over standardized deduplication methods.

Figure 1:
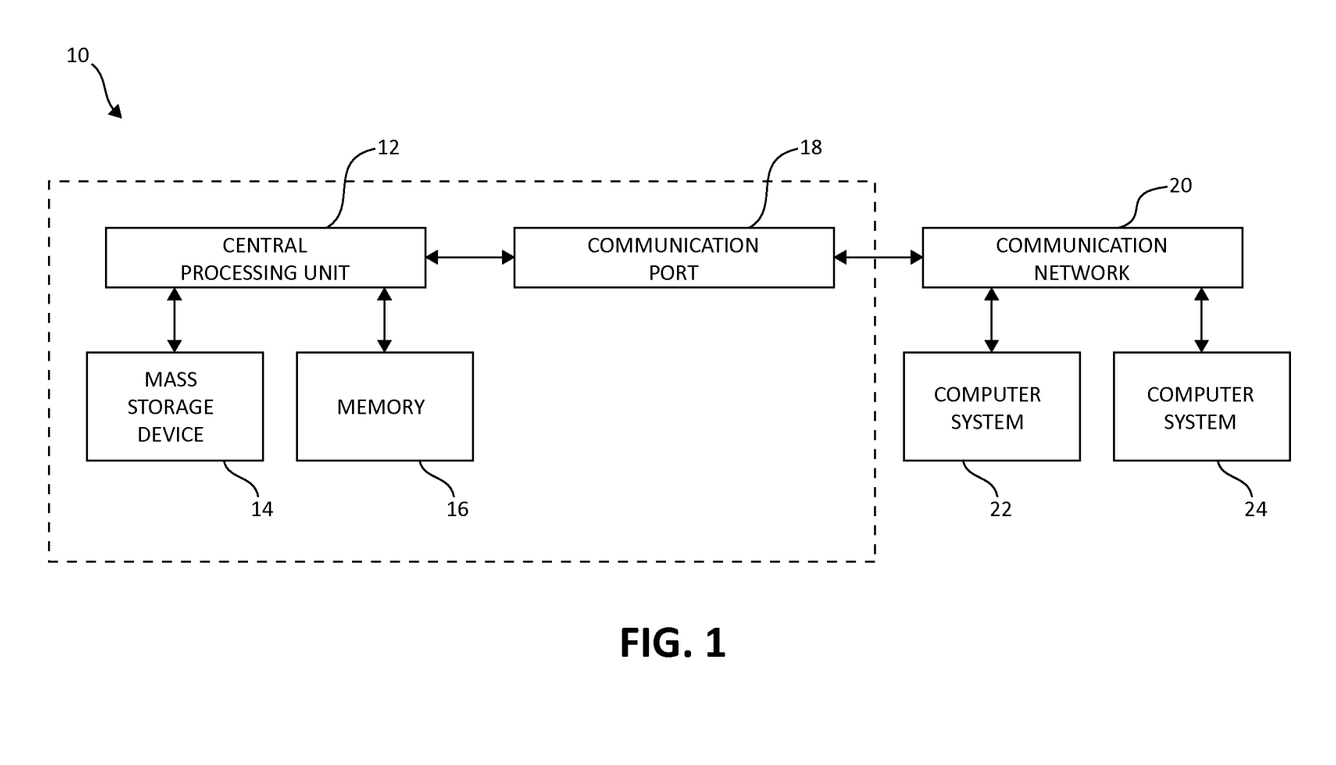
FIG. 1 illustrates a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
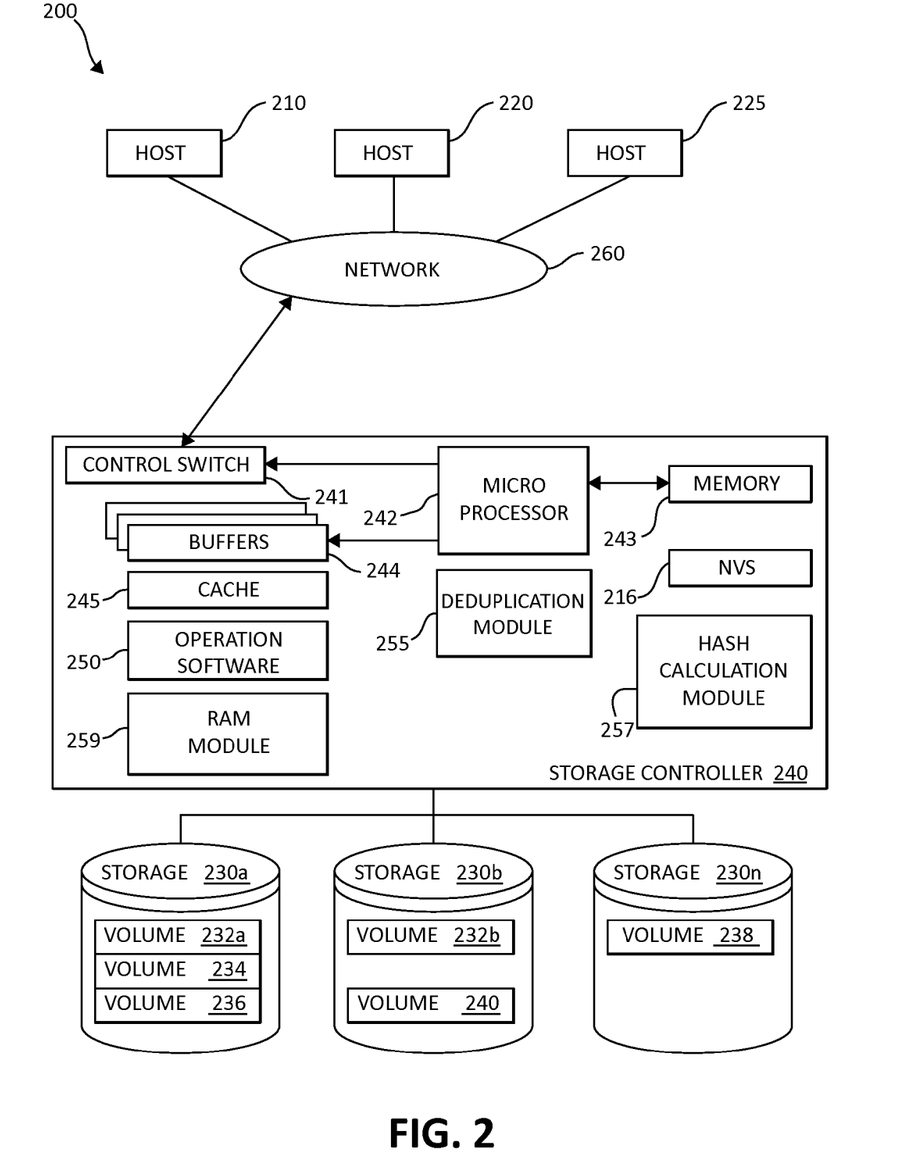
FIG. 2 illustrates a block diagram showing an exemplary hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein.

In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a deduplication module 255, hash calculation module 257, and RAM module 259. It should be noted that the "RAM module 259" illustrates a random-access memory module. However, other storage media, such as solid state drives (SSD), flash technology, hard disks (HDD), or any other type of storage media, may be used and therefore could be labeled and referred to generically as "storage media module 259" or interchangeably with the particular storage media being used for the module, e.g., SSD module 259, HDD module 259, and/or Flash module 250. For convenience and illustration, the term "RAM module" 259 is used in FIG. 2 as an illustration and as an example. The deduplication module 255, hash calculation module 257, and RAM module 259 may work in conjunction with each and every component of the storage controller 240, the hosts 210, 220, 225, and storage devices 230. The deduplication module 255, hash calculation module 257, and RAM module 259 may be structurally one complete module or may be associated and/or included with other individual modules. The deduplication module 255, hash calculation module 257, and RAM module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, deduplication module 255, hash calculation module 257, and RAM module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via a switch called "fabric."

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, deduplication module 255, hash calculation module 257, and RAM module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the deduplication module 255, hash calculation module 257, and RAM module 259 may also be located in the cache 245 or other components. It should be noted that the RAM module 259 can be compared to short-term memory and the hard disk to the long-term memory. In other words, the RAM module 259 is random access memory. The RAM (random access memory) is the place in a computer where the operating system, application programs, and data in current use are kept so that they can be quickly reached by the computer's processor 242. The RAM is much faster to read from and write to than the other kinds of storage in a computer, the hard disk, floppy disk, and CD-ROM. As such, one or more deduplication modules 255, hash calculation modules 257, and RAM modules 259 maybe used as needed, based upon the storage architecture and users preferences.

Figure 3:
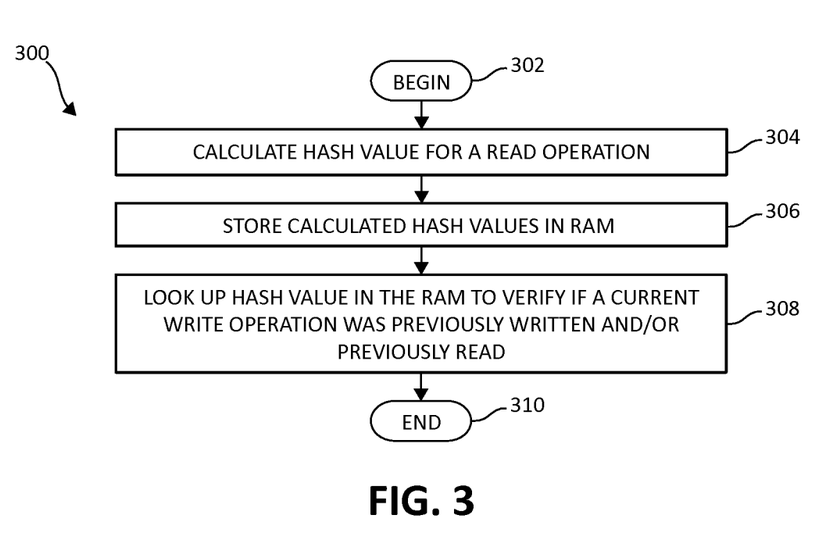
FIG. 3 is a flowchart illustrating an exemplary method for data deduplication using short term history.

Turning now to FIG. 3, a flowchart illustrating an exemplary method 300 data deduplication using short-term history. The method 300 begins (step 302) by calculating a hash value for a read operation (step 304). The method 300 may also calculate a separate hash value for a write operation. The method 300 stores the calculated hash values in a storage media, e.g., RAM or other media, such as solid state drives (SSD), flash technology, hard disks (HDD), or any other type of storage media, may be used) (step 306). When processing a current write operation, the method 300 calculates a hash value for the current write operation and then looks up the hash value in the storage media (e.g., RAM) to verify if the data in the current write operation was previously written and/or previously read (step 308). The method 300 ends.

Figure 4:
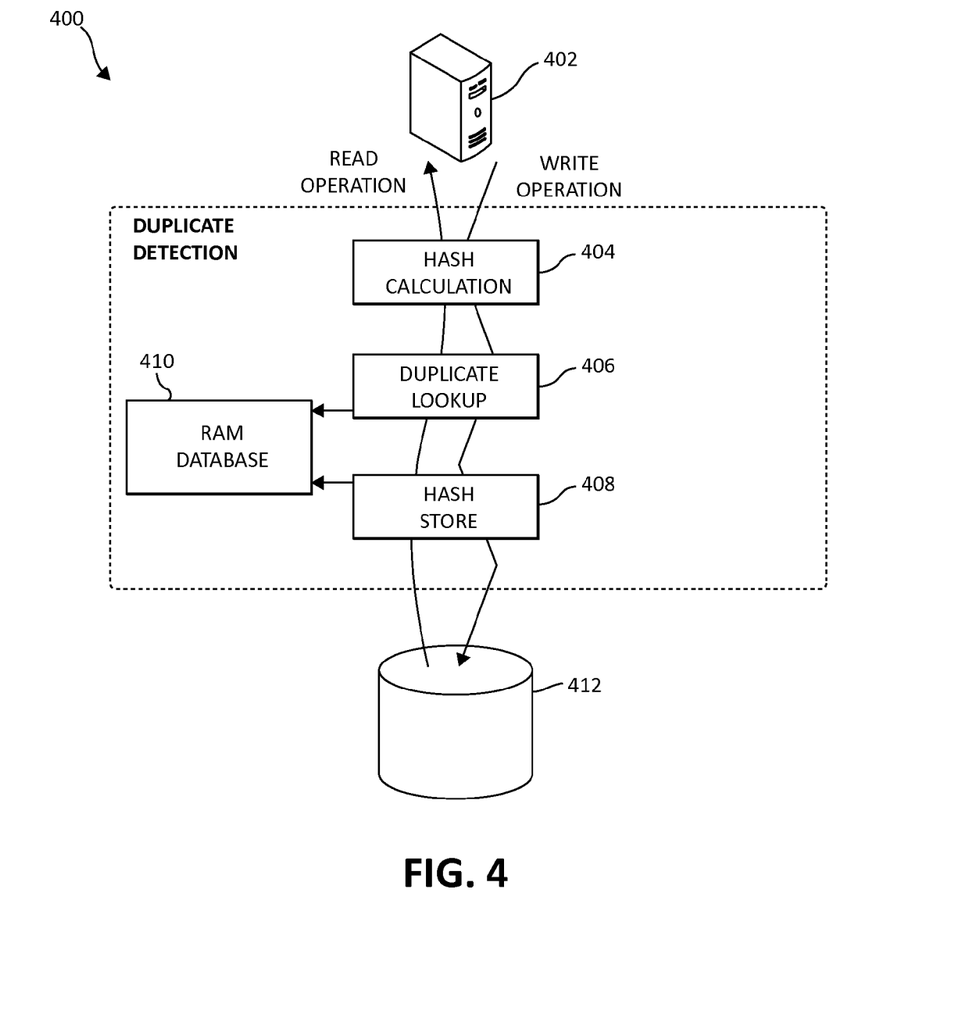
FIG. 4 illustrates a block diagram showing exemplary data deduplication using a short term history.

FIG. 4 illustrates a block diagram 400 showing exemplary data deduplication using short-term history. In one embodiment, the new duplicate detection is performed by calculating a hash value 404 on each data chunk for each read/write operation 402 of data to/from the storage 412. The history of the calculated hash value is stored only in storage media (e.g., RAM) 410, rather than in a database. In so doing, the hash values are only stored and saved in short term memory (e.g., random access memory) for the data to be written to the storage. The mechanisms also calculate hash values 404 on all the data read from the storage 412. At the time of performing a current write operation, a hash value is calculated for the current write operation and then looks up the hash value in the storage media (e.g., RAM) to verify if the data in the current write operation was previously written and/or previously read.

For example, assume that a read operation is performed for a data file. A hash value is calculated on each data chunk for the read operation and generates a unique number for each piece of data, which is then stored in the storage media (e.g., RAM). At this point, assume that a user updates the file several minutes after the read operation on the file is performed. The user now wishes to save the data. A write operation is required to be performed to save the new data. As part of the data deduplication process, the mechanisms of the present invention calculate a new hash value for the data chunk of the current write operation for the updated file. Since the read operation on the data file may have occurred only moments earlier, the mechanisms look up the current write HASH in the storage media (e.g., RAM) and verifies the data in the current write operation was already read in the near past. Hence, since the current calculated hash value on write operation matches the calculated hash value previously performed on the read operation, only the data that was updated/changed in the data block are saved; the changes don't constitute an entirely new file. On the other hand, if the current write operation consists of entirely new data, there will be no calculated hash value in the storage media (e.g., RAM), and the mechanisms will be unable to verify the data was previously written and or read. In this case, the calculated hash value will be added to the storage media and the new data is stored. In so doing, the mechanisms of the present invention provide for a simple architectural design, where only standard memory data structure (e.g., a B-Tree) is required. Also, old deduplicated data that may not be in the database of the standard deduplication solution is detected. The need for I/O for the database look up is eliminated, since there is no database (e.g., no hash history database/table).

Figure 5:
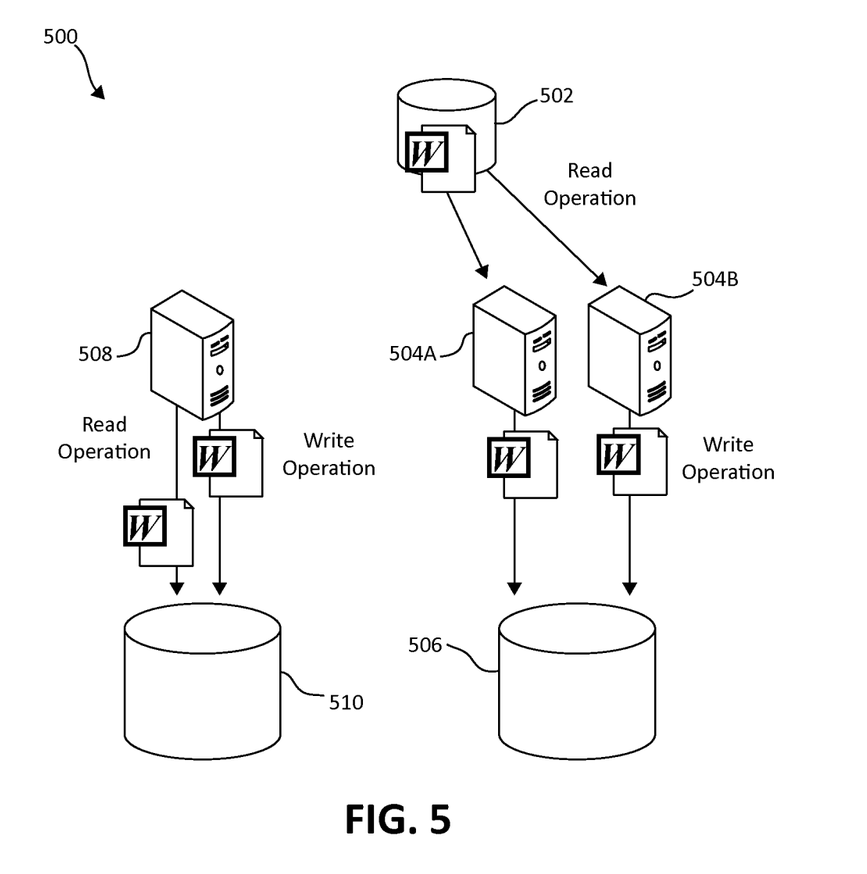
FIG. 5 illustrates an additional block diagram showing alternative exemplary data deduplication using short-term history.

FIG. 5 illustrates an additional block diagram showing alternative exemplary data deduplication using short-term history. In FIG. 5, by way of example only, several architectural solutions are illustrated. Two parallel hosts/servers 404A and 404B are connected to an in association with a storage system 502 and 506. In one embodiment, the new duplicate detection is performed by calculating a hash value for each data chunk that is received from the storage 502 for one of the servers' 504A and/or 504B. The history of the calculated hash value is stored only in a storage media (see FIG. 4, 410), rather than in a database. In so doing, the hash values are only stored and saved in short term memory (e.g., random access memory) for the data to be written to the storage. The hosts/servers 504A and/or 504B may perform a write operation to storage system 506. Prior to performing the current write operation, a hash value is calculated for the current write operation and then the mechanisms looks up the hash value in the storage media (see FIG. 4, 410) to verify if the data in the current write operation was previously written and/or previously read. The current write hash value is located in the storage media history, and therefore, verifies the data in the current write operation was already read in the near past. Since the current calculated hash value on write operation for the data to be stored in 506 matches the calculated hash value previously performed on the read operation from storage system 502, only the data that was updated/changed in the data block are saved in 506. On the other hand, if the current write operation consists of entirely new data, there will be no calculated hash value in the storage media, and the mechanisms will be unable to verify the data was previously written and or read. In this case, the calculated hash value will be added to the storage media and the new data is stored. It should be noted that anytime a read operation and/or a write operation is performed, the calculated hash value will be stored in the storage media.

In an alternative embodiment in FIG. 5, similar to FIG. 4, the new duplicate detection is performed by calculating a hash value calculation operation on each data chunk on each read/write operation of data to/from the storage 510 for the host/server 508. The history of the calculated hash value is stored only in a storage media (e.g., RAM) (see FIG. 4, 410). At the time of performing a current write operation, a hash value is calculated for the current write operation and then looks up the hash value in the storage media (e.g., RAM) to verify if the data in the current write operation was previously written and/or previously read. It should be noted that more than one short-term memory (e.g., RAM) may be required for operation in conjunction with one or more storage systems. The storage media may be externally and/or internally located on any of the storage systems. Thus, even when the source of the deduplication is external to the storage, the interval of the write operation is short. In one embodiment, each of the short-term memory components (e.g. RAM) may be assigned to a specific range of hash values. The mechanisms may direct the current read/write operation to the appropriate storage media assigned to the specific range of hash values. Each of the storage media components may be associated with one or more of the storage systems based upon the specific range of hash values. Each Ram and storage system may be configured together and be in communication with each other. Thus, if multiple read and/or write operations are performed simultaneously from various hosts/storage systems, the mechanisms direct the look up operations in a coordinated fashion to eliminate any duplicate data deduplication and storage. Moreover, to extend the age of the calculated hash value stored in the storage media, eviction policies and/or other techniques common known and used in the art may be applied.

In addition, the mechanisms of the present invention may be applied to a variety of use cases. For example, by way of example only, the mechanisms may be used for copying a file inside of a storage volume, copying files between storage volumes on the same storage, opening a document, modifying the document, and then saving it to a new storage location, creating a new virtual-machine based on an existing image, and/or saving a document by multiple users coming from an external source over a short period of time. These example scenarios are given as examples to provide context and clarification for the mechanisms of the present invention. These example use cases are not an exhausted list and more use cases may be included without limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for data deduplication using short term history in a computing environment, comprising:
   a processor device, operable in the computing storage environment and controls the system for the data deduplication, wherein the processor device is adapted for:
   calculating a hash value on data chunks for a read operation of the data chunks from a storage system, wherein the calculated hash value for the read operation of the data chunks from a storage system is stored in storage media;

calculating an additional hash value for a current write operation to the storage system as part of the data deduplication;

verifying if data chunks for the current write operation were one of a previously written operation and a previously read operation by looking up the calculated hash value in the storage media and comparing the calculated hash value for the read operation of the data chunks from the storage system to the additional hash value of the data chunks for the current write operation as part of the data deduplication; and saving, in the storage system, only those portions of the data chunks that were updated or changed during the current write operation if the calculated hash value for the read operation of the data chunks from the storage system matches the additional hash value of the data chunks for the current write operation as part of the data deduplication, wherein the saved portions of the data chunks that were updated or changed do not constitute a new file.

2. The system of claim 1, wherein the processor device is further adapted for writing all data of the current write operation as new data to the storage system for the current write operation if the calculated hash value for the read operation of the data chunks from the storage system does not match the additional hash value for the write operation and saving the additional hash value for a current write operation in the storage media.

3. The system of claim 1, wherein the processor device is further adapted for configuring the storage media to be one of externally and internally located on at least one of a plurality of storage systems.

4. The system of claim 1, wherein the processor device is further adapted for assigning the storage media to a specific range of hash values.

5. The system of claim 4, wherein the processor device is further adapted for directing the current write operation to the storage media assigned to the specific range of hash values.

6. The system of claim 5, wherein the processor device is further adapted for allocating the storage media to an associated one of the plurality of storage systems based upon the specific range of hash values.

7. The system of claim 6, wherein the processor device is further adapted for deduplicating the data from the current write operation to the at least one of the plurality of storage systems that is associated with the storage media.

8. The system of claim 1, wherein the processor device is further adapted for using an eviction policy to extend the age of the calculated hash value that is stored in the storage media.

9. The system of claim 1, wherein the processor device is further adapted for performing the calculating and the verifying for a plurality of deduplication techniques and a plurality of storage configurations.

10. A computer program product for data deduplication using short term history by a processor device, the computer program product comprising a non-transitory computer-readable storage medium having computer-readable program code portions stored therein, the computer-readable program code portions comprising:

a first executable portion for calculating a hash value on data chunks for a read operation of the data chunks from a storage system, wherein the calculated hash value for the read operation of the data chunks from a storage system is stored in storage media;

a second executable s portion for calculating an additional hash value for a current write operation to the storage system as part of the data deduplication;

a third executable portion for verifying if the data chunks for the current write operation were one of a previously written operation and a previously read operation by looking up the calculated hash value in the storage media and comparing the calculated hash value for the read operation of the data chunks from the storage system to the additional hash value for the current write operation as part of the data deduplication; and a fourth executable portion for saving, in the storage system, only those portions of the data chunks that were updated or changed in the data chunks during the current write operation if the calculated hash value for the read operation of the data chunks from the storage system matches the additional hash value for the write operation, wherein the saved portions of the data chunks that were updated or changed do not constitute a new file.

11. The computer program product of claim 10, further including a fifth executable portion for writing all data of the current write operation as new data to the storage system for the current write operation if the calculated hash value for the read operation of the data chunks from the storage system does not match the additional hash value for the write operation and saving the additional hash value for a current write operation in the storage media.

12. The computer program product of claim 10, further including a fifth executable portion for configuring the storage media to be one of externally and internally located on at least one of a plurality of storage systems.

13. The computer program product of claim 10, further including a fifth executable portion for assigning the storage media to a specific range of hash values.

14. The computer program product of claim 13, further including a sixth executable portion for directing the current write operation to the storage media assigned to the specific range of hash values.

15. The computer program product of claim 14, further including a seventh executable portion for allocating the storage media to an associated one of the plurality of storage systems based upon the specific range of hash values.

16. The computer program product of claim 12, further including an eighth executable portion for deduplicating the data from the current write operation to the at least one of the plurality of storage systems that is associated with the storage media.

17. The computer program product of claim 10, further including a fifth executable portion for using an eviction policy to extend the age of the calculated hash value that is stored in the storage media.

18. The computer program product of claim 10, further including a fifth executable portion for performing the calculating and the verifying for a plurality of deduplication techniques and a plurality of storage configurations.

* * * * *